Figure 1:
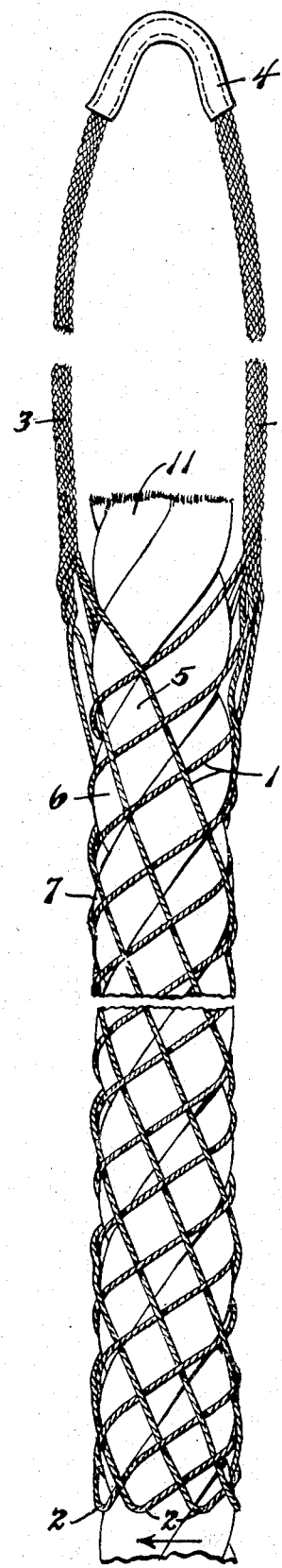

June 27, 1939.    E. E. KELLEMS    2,164,278
GRIPPING DEVICE
Filed June 4, 1938    2 Sheets-Sheet 1

Inventor
E. E. Kellems
By
Robt H Robb
Attorneys

June 27, 1939.  E. E. KELLEMS  2,164,278
GRIPPING DEVICE
Filed June 4, 1938  2 Sheets-Sheet 2
Fig. 3.
Fig. 4.
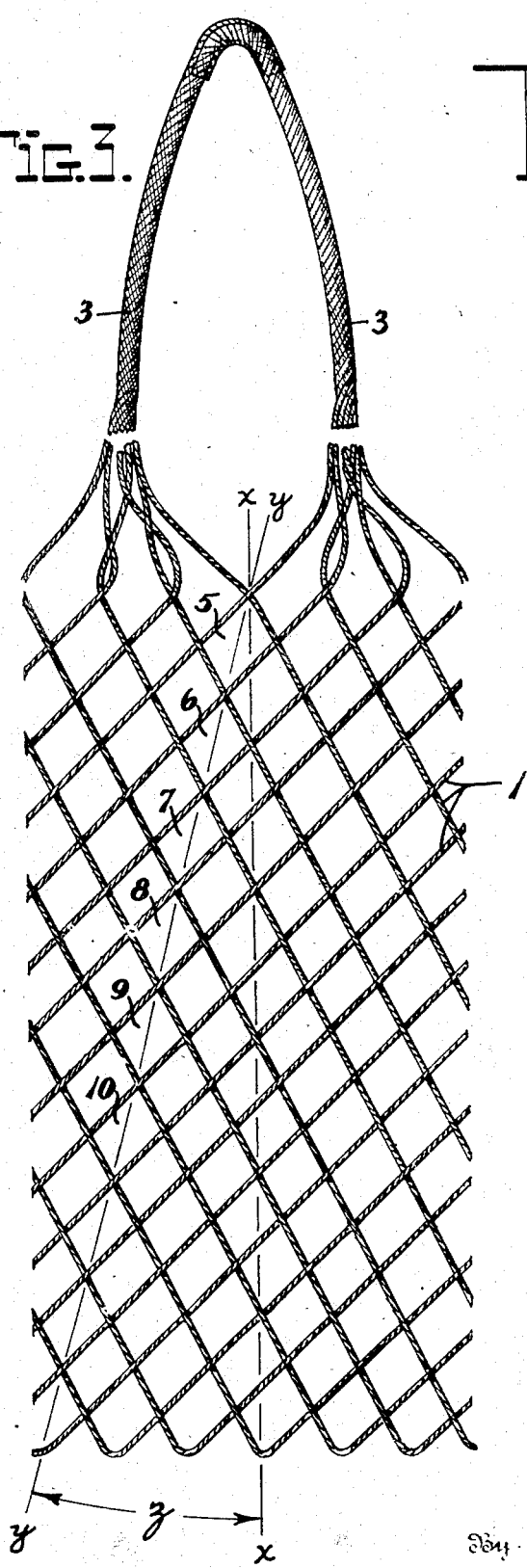
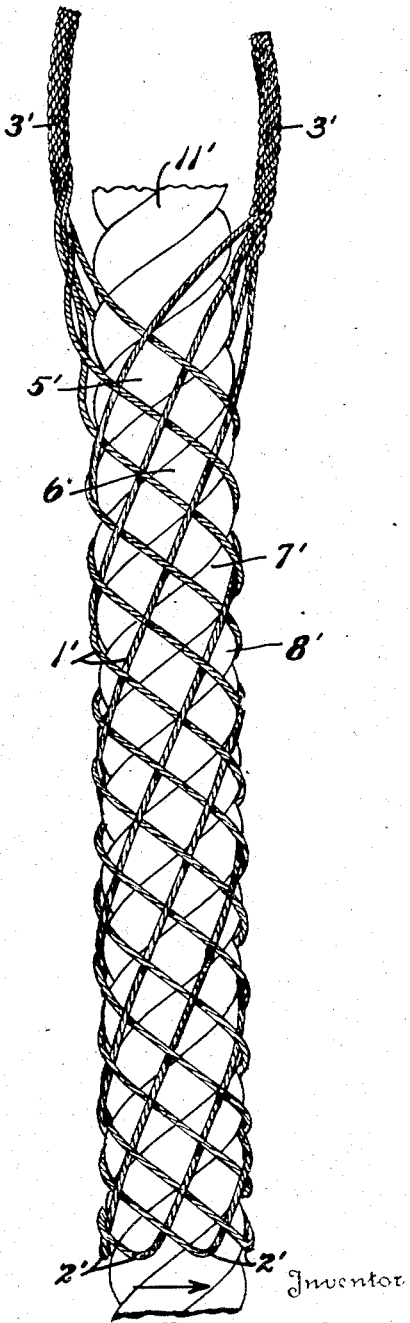
Inventor
E. E. Kellems
Robb & Robb
Attorneys.

Patented June 27, 1939

2,164,278

UNITED STATES PATENT OFFICE 2,164,278

GRIPPING DEVICE

Edgar E. Kellems, Eugene, Oreg., assignor to Kellems Products, Inc., New York, N. Y., a corporation of New York Application June 4, 1938, Serial No. 211,900

8 Claims. (Cl. 24—123)

This invention appertains to gripping devices, and more especially, to improvements in so-called cable grips in which strands of wire or other suitable material are interwoven into tubular form and adapted for radial constriction or contraction and expansion so as to respectively grip and release the cable or other object engaged thereby, responsive to longitudinal extension and contraction respectively of the tubular gripping body.

Gripping bodies of this character are usually woven in tubular form around and upon a suitable mandrel or core, with the intersecting strands forming an open mesh fabric and with each of the interstices of the mesh of generally diamond shape. Moreover, in the conventional construction, the diamond-shaped interstices normally lie in parallel longitudinal rows, each row being parallel with the axis of the tube.

While the construction just described has been largely successful and has gone into extensive use, I have found that it is not as effective as is desirable in certain fields of application, and particularly in cases where the gripping device is used to grip twisted ropes or cables of fiber, wire or other material formed of a plurality of stands twisted together so as to lie generally spirally about the axis of the rope. The strands of such ropes or cables will stretch longitudinally when subjected to tensile strains, and the stretch causes a circumferential twisting of the rope or cable. Thus, in applying the ordinary gripping device to the rope, the gripping or snubbing action upon the portion of the rope within the gripping device tends to become broken when a draft force or the like is imposed upon the gripping device or rope, with the result that the gripping device tends to slip.

The primary object of the present invention is to provide a gripping device having an improved gripping action which will effectively resist slipping of the gripping device relatively to the gripped object when force is applied thereto, and particularly overcoming the former difficulties encountered in the application of the gripping device to twisted ropes or the like.

To this end, my invention contemplates an improved weave wherein the strands of the woven tubular gripping body are so arranged that the interstices of the open mesh fabric are progressively displaced laterally and preferably spiralled around the axis of the tube instead of being arranged in straight longitudinal rows as formerly.

In carrying out the above mentioned object, the lateral displacement of the interstices of the gripping body is preferably opposite to the lay of the rope, or in other words, opposite to the circumferential twist of the rope within the gripping body produced as a result of the application of tensile strain thereto, thereby causing the gripping body to grip the rope more effectively.

Considered in its broad aspect, it is an object of the invention to provide a gripping body of the aforementioned character, wherein a greater resistance to torque is offered by the gripping body in one direction than in the opposite direction.

Other and further objects and advantages of the invention will be hereinafter described, and the novel features thereof defined in the appended claims.

Figure 2:
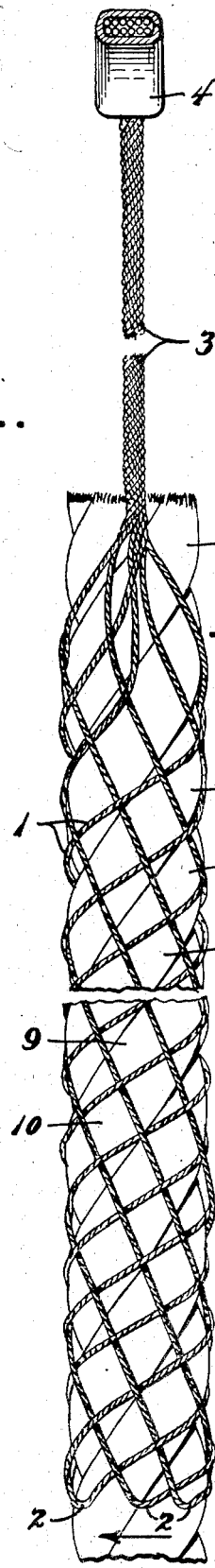

In the drawings:

Figures 1 and 2 are elevations at right angles to each other, illustrating one form of my improved gripping device, and showing the same applied to a twisted rope or cable, the latter being shown more or less diagrammatically;

Figure 3 is an elevation of a grip constructed in accordance with the showing in Figures 1 and 2, the grip having been split longitudinally and opened up to a more or less flat condition so as to show more clearly the lateral displacement of the interstices of the open mesh fabric which characterizes the invention; and Figure 4 is an elevation generally similar to Figure 1, illustrating a grip wherein the lateral displacement of the interstices of the open mesh fabric is in an opposite direction to that shown in Figures 1 to 3.

As illustrated, the gripping device comprises a plurality of strands 1 of wire or other suitable flexible and substantially inelastic material, which are interwoven about a common axis to provide a gripping body having the form of an open mesh fabric. While the construction may be modified in a number of different respects, particularly as regards the form of the opposite ends of the gripping body, the form illustrated is a typical one generally corresponding to that disclosed in my prior Patent No. 1,670,543, wherein the strands 1 are of substantially uniform length, and are folded intermediate their ends at 2 to form continuous loops at the open end of the grip, the opposite ends of the strands being extended towards the other end of the grip and interwoven together in a suitable manner, as by weaving the same around and upon a mandrel or core, as disclosed in my prior Patent Nos. 1,886,026 and 1,966,929. The tubular body is thus able to contract radially when extended endwise, and to expand radially when contracted endwise, for the purpose of respectively gripping and releasing a cable or other object inserted therein. At the end of the body opposite to the loops 2, the strands may be divided into groups 3, 3, each containing a like number of strands arranged in transversely spaced relation to leave the corresponding end of the tubular body open. This permits the object to be gripped to be inserted into the end of the body formed by the loops 2, and passed completely through the body so as to extend beyond the opposite end between the strand groups 3, 3, if desired. In such an arrangement, the strands of the branches 3, 3 are preferably extended substantially beyond the contiguous end of the tubular gripping body, and their free extremities are brought into overlapping relation, as shown in Figure 3, into which position they are firmly bound by any suitable means, as by a metal tube or sleeve 4 which is tightly compressed thereon. By bending the sleeve or tube 4 into substantially U-form, there is thus provided a convenient draft loop composed of the extended strand sections 3, 3, as will be best understood from reference to my prior Patent No. 2,017,625. It is to be understood that the present invention is not limited to the precise construction and arrangement just described, as the same may be altered, according to the use to which the gripping device is to be put. Also the size may be varied as desired.

Passing now to the feature which characterizes the present invention and constitutes the improvement over devices of this sort heretofore used, reference is particularly made to Figure 3, wherein x, x represents a line intersecting the strands 1 of the gripping body longitudinally thereof and parallel to the axis of the body, the gripping body being split and opened up to a flat condition in this view. It will be observed that the diamond-shaped interstices formed by the different intersecting strands 1 of the open mesh fabric are progressively displaced laterally from the line x, x, commencing at one end of the gripping body. For example, the interstices designated 5, 6, 7, 8, 9, 10, etc., lie substantially along a line y, y which is angularly displaced from the line x, x, as indicated by the angle z. As viewed from the end of the gripping body formed by the loops 2, the lateral displacement of the interstices as shown in Figure 3 will be hereinafter referred to as a righthand lay of the strands 1 because the interstices, such as 5, 6, 7, 8, 9, 10, etc., are substantially spirally disposed to the right about the axis of the gripping body when the open mesh fabric portion is in its normal tubular form. Figures 1 and 2 show the construction represented in Figure 3 as embodied in the finished gripping device, and with the device applied to one end of a rope or corresponding object which is adapted to be gripped thereby, the rope being generally designated 11. Under the conditions represented in Figures 1 and 2, if a draft force is applied to the gripping device through means of the draft loop formed by the interconnected strand groups 3, 3, or a tensile strain is otherwise applied to the rope 11, the tubular gripping body formed by the strands 1 will tend to elongate, thus radially constricting or contracting the body upon the rope. Assuming the rope to be of a twisted type with the strands thereof embodied therein in the form of a righthand lay, as shown in Figures 1 and 2, and assuming that the portion of the rope which is embraced within the gripping body normally tends to twist circumferentially in a counter-clockwise direction (as viewed from the end of the grip which is formed by the loops 2) when subjected to tensile strain, as indicated by the arrows shown at the bottom of Figures 1 and 2, the effect of the circumferential twist of the rope is to cause a corresponding twist to be imparted to the tubular gripping body. This results in the production of an increased gripping effect of the gripping body upon the rope. It will be seen that in the case just given, with the conditions as assumed, the twist of the rope inside the grip, when under tensile strain, is in the opposite direction to the lay of the gripping device, which, according to the construction illustrated in Figures 1 and 2, is a righthand lay because the progressive displacement of the interstices formed by the different intersecting strands 1 causes these interstices to assume positions spiralling to the right about the axis of the gripping body, as viewed from the open end formed by the loops 2.

It has been found that in some cases it is better to make the lay or spiral of the weave of the gripping body in the same direction as the spiral or lay of the component rope strands, and in other cases in the opposite direction, because the twisting action of the portion of the ropes within the gripping body, when under tensile strain, is different with different types of ropes. The important point to be borne in mind in the application of my invention is that the lay of the gripping body preferably should be opposite to the twisting action of the portion of the body to be gripped thereby in order to obtain the most effective gripping action. Of course, the invention is not limited to use for gripping twisted bodies such as ropes, wire cables and the like, as it may be used for any of the various purposes to which devices of this general character have been heretofore employed.

When the gripping device is constructed in accordance with the present invention, I have found that it tends to automatically contract radially to a much greater degree than in those cases where the open mesh fabric is of the old construction in which the interstices are arranged in straight longitudinally extending rows. This improved automatic contraction is due to the spiral displacement of the interstices, and materially aids in initiating the gripping action of the gripping device upon the body to be gripped. Moreover, the spiral displacement of the interstices as herein referred to causes the gripping device to offer a greater resistance to torque in one direction than in the opposite direction. The greater resistance is in a direction opposite to the spiral displacement of the interstices, and hence the gripping device will resist twisting of the rope in this direction while under tension, which is a great advantage in some cases.

I have also found that with the interstices of the gripping body laterally displaced and substantially spirally disposed opposite to the lay of the rope, it is much easier to insert the rope to be gripped therein and to remove the rope therefrom, as by producing a relative rotative movement between the gripping device and the rope in the proper direction during the insertion or removal of the rope, the gripping device tends to expand radially more readily, and the rope tends at the same time to decrease in diameter. This is particularly advantageous in cases where the gripping device is applied to relatively flexible objects such as manila ropes, wire cables, and the like. For example, in applying the gripping device to the end of the rope 11, as shown in Figures 1 and 2, the rope can be more easily inserted therein by twisting or turning the gripping device in a counter-clockwise direction while the rope is being inserted therein, as viewed from the open end formed by the loops 2. In this construction just referred to, the lateral displacement of the interstices forms a spiral in a clockwise direction, as viewed from the open end of the tube formed by the loops 2.

Referring to Figure 4, the construction of the gripping device is the same as that illustrated in Figures 1 to 3, with the exception that the lateral displacement of the interstices 5', 6', 7', 8', etc., is opposite to the displacement shown in Figures 1 to 3. In other words, the strands 1' are interwoven in the form of a lefthand lay with the interstices of the open mesh fabric extending spirally around the axis of the tube in a counter-clockwise direction as viewed from the open end formed by the loops 2'. The free ends of the strands 1' may be grouped together in transversely spaced groups 3', 3' to form a draft loop at the end of the fabric opposite to the loops 2'. The rope 11' shown in Figure 4 is assumed to be of such a type that when subjected to tensile strain, that portion which is embraced within the gripping body tends to twist in the direction indicated by the arrow at the bottom of this figure. Since the direction of twist of the rope under tensile strain is opposite to the spiral disposition of the interstices 5', 6', 7', 8', etc., the rope will be gripped by the gripping device in a more effective manner, minimizing any tendency of the gripping device to slip relatively to the rope while under tensile strain. Application of the gripping device to the rope and removal of the gripping device therefrom will be facilitated if the application and removal is accompanied by a turning movement of the gripping device in a clockwise direction as viewed from the open end of the tube formed by the loops 2'. In the case of a gripping device having a lefthand lay according to the construction shown in Figure 4, this turning movement in a clockwise direction tends to cause the tubular open mesh fabric to more readily expand radially.

It has been found to be advantageous at times to employ the so-called spiral weave referred to herein, wherein the interstices of the woven fabric are laterally displaced progressively from a longitudinal line, for only a portion of the length of the grip, with the remainder of the tube constructed in any of the various conventional ways heretofore used. In other words, the spiral weave may be combined with a tapered weave, as disclosed in my prior Patent No. 1,966,929, or with a variable mesh as disclosed in my Patent No. 1,886,026, or combined with a variable reinforcement of the weave as disclosed in my Patent No. 2,093,838, or in combination with one or more of these different constructions, whichever is best suited to meet the particular requirements encountered. Also, there may be cases where it is advantageous to vary the spiral. For instance, the grip may be made with no spiral for a portion of this length and then change gradually from a small spiral to a steep spiral at other portions. The improved automatic radial contraction of the gripping device which is characteristic of the so-called spiral weave herein described, is useful and of particular advantage in practically all fields of application of devices of this general character. Therefore, the invention is not restricted to use for gripping ropes and similar flexible objects.

While the specific details have been herein shown and described, the invention is not confined thereto as changes and alterations may be made without departing from the spirit thereof as defined by the appended claims.

Having thus described my invention, what I claim as new and desire to secure by Letters Patent is:

1. A gripping device of the class described, comprising a plurality of interwoven flexible is forming an open-mesh fabric adapted to embrace the body to be gripped, and said strands being so arranged that the interstices of the fabric lying at opposite sides longitudinally of the intersecting strands are progressively displaced laterally from a line running longitudinally of the fabric.

2. A gripping device of the class described, comprising an expansible and contractible tubular open-mesh fabric body formed of a plurality of intersecting flexible strands, and said strands being so arranged that the interstices of the fabric lying at opposite sides longitudinally of the intersecting strands of each longitudinal row of intersections are disposed spirally about the axis of the tubular body.

3. A gripping device adapted to be applied to twisted ropes and the like, said device comprising an open-mesh woven tubular body formed of intersecting flexible strands, said strands being so arranged that the interstices of the body lying at opposite sides longitudinally of the intersecting strands of each longitudinal row of intersections are progressively displaced laterally from a line extending longitudinally along the body, and the lateral displacement being in a direction opposite to the inherent torque of the portion of the rope embraced by the gripping body when the rope is subjected to tensile strain.

4. An open mesh woven tubular gripping body composed of a plurality of intersecting flexible strands, wherein the strands are so arranged as to offer a greater resistance in one direction than in an opposite direction to circumferential displacement of the strands of one portion of the body relative to another portion of the body.

5. A body composed of a plurality of relatively flexible and resilient strands interwoven about a common axis to form an elongated expansible and contractible tubular open-mesh fabric, said strands being so arranged that the interstices of said fabric which lie at opposite sides longitudinally of the intersecting strands of each longitudinal row of intersections are progressively displaced laterally from a line extending longitudinally through the fabric.

6. A gripping device of the class described, comprising a fabric composed of a plurality of sets of intersecting relatively flexible and resilient strands, the strands of one set being disposed at a greater angle respecting the longitudinal dimension of the fabric than the strands of the other set.

7. A gripping device of the class described, comprising an open-mesh fabric composed of a plurality of sets of intersecting relatively flexible and resilient strands interwoven spirally about a common axis, the strands of one set having a different pitch than the strands of the other set, whereby to automatically initiate a continued gripping action when a body to be gripped is embraced therein.

8. A gripping device of the class described, comprising an open-mesh fabric composed of a plurality of sets of intersecting relatively flexible and resilient strands interwoven spirally about a common axis, the strands of one set having a different pitch than the strands of the other set so that by twisting the fabric in one direction, the gripping device will automatically expand to facilitate the reception of a body to be gripped therein, and when the twist is released, the device will automatically contract and initiate a continued gripping action.

EDGAR E. KELLEMS.